(12) United States Patent  
Boillot et al.

(10) Patent No.: US 8,334,841 B2
(45) Date of Patent: Dec. 18, 2012

(54) VIRTUAL USER INTERFACE METHOD AND SYSTEM THEREOF

(75) Inventors: Marc Boillot, Plantation, FL (US); Jason McIntosh, Sugar Hills, GA (US)

(73) Assignee: NaviSense, Plantation, FL (US)

( * ) Notice: Subject to any disclaimer, the term of this patent is extended or adjusted under 35 U.S.C. 154(b) by 1096 days.

(21) Appl. No.: 11/683,415

(22) Filed: Mar. 7, 2007

(65) Prior Publication Data

US 2007/0211023 A1 Sep. 13, 2007

Related U.S. Application Data

(60) Provisional application No. 60/781,179, filed on Mar. 13, 2006.

(51) Int. Cl.
*G06F 3/033* (2006.01)
*G09G 5/08* (2006.01)

(52) U.S. Cl. ........................................................ 345/158

(58) Field of Classification Search .................. 345/156, 345/158, 173, 175–177; 178/18.04, 18.09, 178/19.02, 19.05
See application file for complete search history.

(56) References Cited

U.S. PATENT DOCUMENTS

| | | | |
|---|---|---|---|
| 4,506,354 A * | 3/1985 | Hansen | 367/101 |
| 5,274,363 A | 12/1993 | Koved | |
| 5,367,614 A * | 11/1994 | Bisey | 345/419 |
| 6,130,683 A | 10/2000 | Null | |
| 6,137,427 A | 10/2000 | Binstead | |
| 6,313,825 B1 | 11/2001 | Gilbert | |
| 6,614,422 B1 * | 9/2003 | Rafii et al. | 345/168 |
| 6,937,227 B2 | 8/2005 | Qamhiyah et al. | |
| 7,078,911 B2 | 7/2006 | Cehelnik | |
| 7,081,884 B2 | 7/2006 | Kong | |
| 7,092,109 B2 | 8/2006 | Satoh et al. | |
| 7,130,754 B2 | 10/2006 | Satoh et al. | |
| 2001/0054114 A1 * | 12/2001 | DuVal et al. | 709/247 |
| 2006/0092022 A1 | 5/2006 | Cehelnik | |
| 2006/0161870 A1 * | 7/2006 | Hotelling et al. | 715/863 |
| 2006/0161871 A1 | 7/2006 | Hotelling | |
| 2006/0256090 A1 | 11/2006 | Huppi | |

* cited by examiner

*Primary Examiner* — Amr Awad
*Assistant Examiner* — Kenneth Bukowski

(57) ABSTRACT

A virtual user interface (VUI) is provided. The VUI (120) can include a touchless sensing unit (110) for identifying and tracking at least one object in a touchless sensory field, a processor (130) communicatively coupled to the sensing unit for capturing a movement of the object within the touchless sensory field, and a driver (132) for converting the movement to a coordinate object (133). In one aspect, the VUI can implement an applications program interface (134) for receiving the coordinate object and providing the coordinate object to the virtual user interface (VUI). An object movement within the sensory field of the VUI can activate user components in a User Interface (150).

17 Claims, 4 Drawing Sheets

VIRTUAL USER INTERFACE METHOD AND SYSTEM THEREOF

This application claims the priority benefit of U.S. Provisional Patent Application No. 60/781,179 entitled "Sensory User Interface" filed Mar. 13, 2006.

This application also incorporates by reference the following Applications: Ser. No. 11/683,410 entitled "Method and Device for Three-Dimensional Sensing", Ser. No. 11/683,412 entitled "Application Programming Interface (API) for Sensory Events", Ser. No. 11/683,413 entitled "Visual Toolkit for a Virtual User Interface", and Ser. No. 11/683,416 entitled "Touchless Tablet Method and Device Thereof" all filed on the same day as this Application.

FIELD

The present embodiments of the invention generally relates to the field of communications, more particularly to user interfaces.

BACKGROUND

A graphical user interface (GUI) provides a visual interface whereby a user can interact with a program, device, or system through interaction with the GUI. A computer system generally includes a mouse and keyboard to navigate and control a cursor or data entry to the computer. Graphical components in the GUI can be activated by positioning the cursor over the component and physically performing a single or double click on the mouse to activate a component response. A user can also handle the mouse to move the cursor to other graphical components in accordance with the physical movement of the mouse. A user controlling the mouse is provided physical feedback through the physical actions of the handling and the positioning of the mouse. A touchpad, stick, or roller ball, can also be used to control a cursor on the display. A touchscreen can also serve as an input device which allows a user to touch the screen for performing an input action or receiving a response. Menu buttons on a touchscreen are highlighted when depressed and the user can sense when the touchscreen is touched. Touchscreens can be used in applications where contact with the screen provides direct access to the GUI components. These various input devices allow a user to interact with a computer system to visually see and feel a response when interacting with the computer system. For example, movement of a mouse corresponds with visual movement of a cursor object on a screen. Typing on a keyboard results in characters being displayed on a screen, and interaction with a touchscreen can be seen as visual menu effects.

The mouse, touchpad, and stick generally require physical movement to assume control. A user can receive visual and physical feedback with the stick and touchpad. For example, the user can see the cursor move in accordance with effort applied to the stick or touchpad. The user is also provided physical feedback when the user feels the slight resistance to sliding the finger along the touchpad. A user can also identify physical feedback when using a stick to control the cursor. A touchscreen or a tablet also provide physical and visual feedback. A user can physically touch the screen or use a stylus to activate a behavior. A keyboard can also serve as an input device which allows a user to enter in text to a computer program or application. The user can become accustomed to the level of resistance or the softness of keys when typing on a keyboard to become proficient. Also, typing on a keyboard results in characters being displayed on a screen thereby providing visual feedback.

SUMMARY

In one arrangement, a motion sensing unit can be used to control a cursor on a screen. The motion sensing unit identifies and tracks finger movement similar to a mouse for controlling a cursor, or for navigating a GUI, similar to operation of a touchscreen. However, a motion touchless sensing unit does not provide physical feedback. Consequently, a user using a motion sensing unit to interface with a computer system does not receive any of the visual, auditory, or physical feedback commonly associated with standard input peripheral devices for controlling or assessing the recognition of their action. A need therefore exists for providing a touchless user interface when developing and using motion detection systems for input device pointing.

Embodiments of the invention are directed to a virtual user interface (VUI). The VUI can include a touchless sensing unit for identifying and tracking at least one object in a touchless sensory field, a processor communicatively coupled to the touchless sensing unit for capturing a movement of the object within the touchless sensory field, and a driver for converting the movement to a coordinate object. In one aspect, a communication device presenting the VUI can implement a sensory Applications Programming Interface (API) for receiving the coordinate object. The communication device can control one or more user components in a user interface (UI), or at least a portion of the user interface, using the coordinate object through the sensory API. An object movement within the sensory field of the VUI can activate user components in the UI hosted by the communication device.

The VUI can include at least one virtual component, wherein a movement in the sensory field at a location of the virtual component corresponds to an activation of a user component in the UI. A processor can determine at least one of a push action, a release action, a hold action, and a sliding action of the object on a virtual component for controlling a behavior of a user component in the UI. The user component may be a graphical component or a non-graphical component. The coordinate object can include one of an absolute location, a relative difference, a velocity, and an acceleration of the object for identifying the behavior. The processor can also includes a timer for determining a length of time the object is at a position in a touchless sensory field. In one arrangement the sensing unit can be an array of motion detection sensors. The sensitivity of the sensory field can be adjusted by varying the strength of the touchless sensing unit.

Embodiments of the invention also concern a method for creating a coordinate object for use in a VUI. The method can include identifying and tracking at least one object in a touchless sensory field, capturing a movement of the object within the touchless sensory field, and converting the movement to a coordinate object. The coordinate object can be provided to the UI for processing a sensory event.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION

Figure 1:
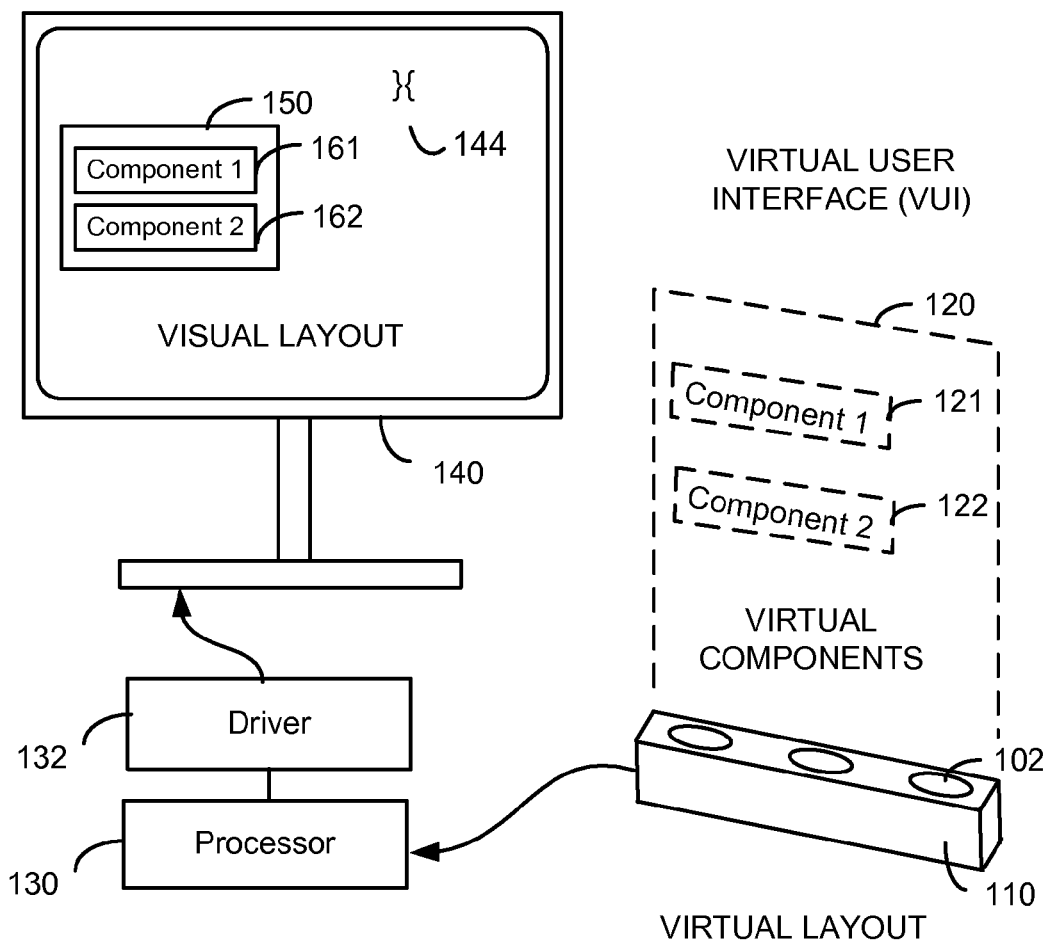
FIG. 1 illustrates a touchless Virtual user interface (VUI) in accordance with an embodiment of the inventive arrangements.

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The term touchless sensing is defined as sensing movement without physically touching the object causing the movement. The term cursor can be defined as a cursor on a display and providing control to an underlying object. The cursor can be a handle to an object in the display, or a physical object remote from the display but visually controlled using the cursor on the display. The term cursor object can be defined as an object that can receive coordinate information for positioning the object. The cursor can be a handle to the object, wherein the object can be controlled via the cursor. In one example, a cursor object can be the target of a game control for handling an object in the game. The term activating or activation is defined as enabling, disabling, or moderating a control. The term activation cue is defined as an action that imparts an operation on a control. The operation can be the initiating of the control, the termination of the control, the pausing of the control, or the moderating of the control though is not limited to these. The activation cue can be a physical motion such as a finger movement, hand gesture, or a vocal motion such as a spoken utterance though is not limited to these. The term cue is defined as an act or behavior; the act may be rehearsed or intentional but not limited to these.

The term User Interface (UI) can be defined as an interface providing access to one or more underlying controls of an application hosted by a computing device. As an example a UI can be a graphical user interface (GUI) that presents one or more graphical components that can perform a control function in response to an applied action. As another example a UI can be an Audible User Interface (AUI) that generates audio in response to a control of a user component. A user component can be an element in a UI that receives the action and performs a function in response to the action. A Virtual User Interface (VUI) can be defined as a touchless user interface having one or more virtual components that perform a function in response to an touchless sensory event applied in a sensing field. As an example, a touchless sensory event can be a touchless pressing action of a finger on a virtual component in a touchless sensing field. A touchless sensory attribute can be broadly defined as a measurement of a touchless sensory event, such as a magnitude of the touchless sensory event. A visual layout can be defined as a presentation of user components in a UI that are visible. A virtual layout can be defined as a presentation of virtual components in a VUI that are not directly visible.

Embodiments of the invention are directed to a system and method for a Virtual User Interface (VUI). In one arrangement, the VUI can include virtual components that correspond to user components in a User Interface. As an example, a user interface may be a media console having user components for adjusting audio or visual controls. In another arrangement, the VUI allows a user to control graphical components of a graphical user interface (GUI). For example, a GUI can contain a number of graphical components such as buttons, sliders, radio buttons, and the like that can be manipulated to control an application, a device, or a computer system. Movement of an object, such as a finger, within a touchless sensory field of the VUI can acquire control of user components in the UI. A touchless sensing unit can produce the VUI such that a movement and location of an object within the virtual interface can be detected and identified. The movement and location can be used to activate behaviors of the user components within the UI. In one aspect, a user can interact with a UI through a VUI in a manner similar to using a mouse, but using touchless sensory events.

In a first embodiment, a virtual user interface (VUI) is provided that maps virtual components in a touchless sensing field to user components in a user interface (UI) managed by a communication device, and translates touchless finger actions applied to the virtual components to actions on the user components for controlling at least a portion of the UI.

In a second embodiment, a method, comprising a touchless sensing unit supplying a coordinate object to a communication device that receives the coordinate object, for controlling at least a portion of a user interface (UI) managed by the communication device is provided. The coordinate object can be created by detecting a touchless finger action applied to at least one virtual component in a touchless sensory field, an converting the finger action to a coordinate object for controlling at least a portion of the UI.

Referring to FIG. 1, a VUI application 100 is shown. The VUI application 100 can include a touchless sensing unit 110, a VUI 120, a processor 130, a driver 132, a display 140, and a UI 150. The touchless sensing unit 110 can project a virtual layout of virtual components 121 in the VUI 120 that correspond to user components 151 similarly arranged in the visual layout of the UI 150. The virtual layout of the VUI 120 may be visible or non-visible. For example, if the sensing unit 110 comprises an array of directional ultrasonic transducers, then a non-visible vertical planar sensory field can be generated. Also, when the sensing unit comprises an array of omni-directional ultrasonic transducers, then a non-visible region can be generated. In another arrangement, holograms techniques can be employed to create a visible virtual layout, or raster laser scanning to project a visible layout on a surface. In either mode, virtual components 121 can be arranged in the virtual layout of the VUI 120 within the sensory field of the sensing unit 110. The sensory field is the region within which an object, such as a finger, can be detected and which corresponds to the virtual interface. In another arrangement, the touchless sensing unit 110 can be positioned on a side to generate the sensory field along the plane of a surface such as a desk. The sensing unit 110 can project a visual representation of the VUI 120 onto a form sheet.

The processor 130 can identify a location of an object within the sensory field of the sensing unit 110, and track movement of the object within the VUI 120. For example when the sensory field is an approximately vertical planar surface (120) such as that shown in FIG. 1, the processor 130 can identify a location of an object, such as a finger, when the object enters the sensory field and obscures a continuity of a portion of the sensing field. The processor 130 can convert the sensory information into coordinate information. For example, the processor can determine an X, Y, and Z coordinate of an object within the sensory field. The driver 132 can communicate the coordinate information as an object to the UI 150, which can interpret the coordinate information and perform one or more control operations, such as navigating a cursor 144 along two dimensions in the display 140, controlling a media console, or navigating through a menu structure. The driver 132 can generate a coordinate object that translates the coordinate information in a format provided by the processor 130 to a format recognizable by a device exposing the UI 150. In various arrangements, the driver can be a tablet driver, a touchpad driver, a touchscreen driver, a stylus driver, or a mouse driver The UI 150 can receive finger actions from the coordinate object, which can identify locations of the user components in the UI 150 corresponding to a location of the virtual components in the virtual layout of the VUI 120. When an object in the sensory field of the VUI 120 moves over a virtual component (121), the UI 150 can determine which graphical component in the UI 150 corresponds to the location of the object in the virtual layout (161). The UI 150 can be presented on the display 140 of a computer, mobile device, or any other system. The touchless sensing unit 110 can receive power from a battery, a USB line, or an independent power supply. A user can interact with the UI 150 by moving a finger to virtual components within the VUI 120. A user can perform touchless push actions on the virtual components of the VUI 120 to activate a response in the UI 150. Notably, the VUI 120 is distinct and separate from the GUI 130 in that it is touchless. A user can interact with the UI 150 by moving a finger within the sensory field of the VUI 120.

In one embodiment, but not herein limited, the touchless sensing system can comprise an array of ultrasonic transducers that convert finger motion into coordinate locations. Alternatively, a microphone array system, a beamforming array, a three-dimensional imaging system, a camera system, a laser system, an optical sensing unit, a micro-electromechanical (MEMS) system, a laser system, or an infrared unit can be employed for acquiring object movement such as a finger location for converting finger movement into a coordinate signal. In one application, a user can move their finger within the VUI 120 to navigate and control the cursor 144 on the display 140. The coordinate information can also be used to navigate and control user components 161-162 within the UI 150. For example, a user can position a finger over component 1 (121) in the VUI 120 and perform a touchless command. For example, the user may push forward denoting a push action if the component is a virtual button. A user can move a finger within a sensing field of the VUI 120 generated by touchless sensing unit 110, and the processor 130 and driver 132 can provide control information to the UI 150 in accordance with the finger movement. In one aspect, the processor 130 and the driver 132 can be internal to the sensing device 110. In one configuration, the sensing unit 110 can provide coordinate information directly to the GUI through a USB port, a Bluetooth, Wireless Fidelity (WiFi), or a ZigBee connection.

Because the VUI 150 is not generally visible, it may be difficult to coordinate hand and eye movement to interact with visual components in the UI 150 when moving the finger in the virtual layout of the VUI 120. Accordingly, the UI 150 identifies which buttons the finger is nearest in order to provide visual feedback to the user. For example, the processor 130 identifies a coordinate location of the finger in the VUI 120 which is provided to the UI 150 via the driver 132. The UI 150 can translate the coordinate location to identify which user component is nearest in relative proximity to the virtual component closest to the finger in the VUI 120. The UI 150 can adjust the color of the graphical component, flash the graphical component, or provide another visual or auditory indication to the user to indicate which graphical component is closest in association with the finger position. In particular, the processor 130 tracks finger movement and relays the coordinate information to the UI 150. The UI interprets the location and continually updates visual and/or auditory aspects of the user components for providing the user feedback as to where the finger is in the VUI 120 relative to a user component in the UI 150. Notably, the UI 150 can have more than the number of components shown, with more function than an exemplary push button. The VUI 120 can support most all graphical elements currently available to a mouse, keyboard, touchpad, tablet, or stylus input device.

The processor 130 identifies and tracks relative motion such as a finger displacement in the VUI 120 identifying differences in movement. Upon detecting a generally stationary motion, the processor 130 and driver 132 signal a sensory event to the UI 150. For example, a stationary movement can correspond to a user identifying a component with which to interact. The UI 150 can provide increased visual or auditory feedback for acknowledging a recognition of the sensory event. Accordingly, a user may push forward, such as a button push, or signal the finger up and down, in the VUI 120 to signify that the user is intending on depressing a virtual component. As another example, the user may apply an up, down, left, right, clockwise, or counterclockwise motion to a VUI component. Visual feedback can be provided by the UI 150 for acknowledging the finger action. For example, the user may position a finger above component 1 (121) for a short duration of time, and then push forward to indirectly activate a depressing action on the graphical component (151).

The processor 130 can discriminate between navigation commands and sensory events. For example, a navigation command can be the moving of the finger in a generally forward, vertical, or horizontal direction. A sensory event, can be a component action such as a button press, a slide, a release, a hold or a combinational event such as a push and hold, a push and slide, a push slide and release. A finger event may be a pattern such as an up/down, left/right, or clockwise/counter clockwise motion. As an example, the processor 130 detects the horizontal and vertical movement and relays the movement to the UI. The driver 132 can provide pattern information, absolute coordinates, or relative coordinates to the UI. In the latter, the processor 130 identifies differential movement between current and previous movements and provides a relative motion to the driver. The processor 130 can include a timer which determines a length of time at a position. It can include a storage for saving a history of previous events. For example the finger may be at Cartesian coordinate (1,20) and then move to coordinate (2,5). The driver can send a differential coordinate (−1,−15) instead of the actual updated coordinate. The UI can determine if the differential movement corresponds to the location of another graphical component. For example, the user's finger may be over Component 1 (121), and then slowly move to Component 2 (122). The UI can determine using relative and differential coordinates that the finger has moved from graphical component (161) to component (162) in the GUI.

In one embodiment, the touchless sensing unit 110 can comprise ultrasonic sensors that emit and receive acoustic pulses. Accordingly, the sensing field associated with the VUI 120 corresponds to a region within which a reflected energy pulse can be detected. The sensing field can be a function of the emitted pulse strength and the range (e.g. distance). For example, an ultrasonic sensing unit may only need a range corresponding to the maximum extent of the hand or finger movement, which may be under 12 inches. The ultrasonic sensing unit can be positioned above a communication device, along a display, or as a standalone unit. The user can move the finger within the sensing field for interacting with the VUI 120. The ultrasonic sensing unit can include at least one transmitter and receiver for transmitting and receiving ultrasonic signals. The transmitter and emitter can be the same for providing dual transmit and receive functions. In another arrangement, the sensing element can be an array of micro acoustic microphones or micro speakers for transmitting and receiving audio signals. Principles of pulse-echo detection can be employed to estimate a range and position of a finger within view of the sensing elements. For example, a transmitter in the sensing unit emits a pulse shaped signal that reflects off the finger which is detected by a receiver element in the sensing unit. The receiver element is coupled with a detector that detects a reflected signal as part of the motion detection logic in the sensing unit. A time of flight can be determined and a position can be estimated from the time of flight. The detector can include additional processing logic such as thresholds, comparators, logic gates, clocks, and the like for detecting an object's motion. The sensing unit 110 calculates a position of the object causing the reflection by solving a set of geometric equations.

In one exemplary embodiment, a transmit and receive element pair in the touchless sensing unit 110 calculates a first range (e.g. distance) of an object in the sensing field. A first transmit and receive pair on an x-axis estimates a longitudinal range of the object (e.g. finger). A second pair, arranged separately from the first pair, estimate a second range. The second pair estimates a latitudinal range of the object (e.g. finger). Accordingly, the two range measurements establish a position (e.g. location) of the object causing the signal reflection by mathematically combining the geometrically related range measurements. For example, the first range measurement establishes a x-coordinate and the second range measurement establishes a y-coordinate. The location of the object is then determined to correspond to the point (x,y) in a single plane. For example, the plane will be oriented in the direction of the first and second paired ultrasonic elements. Accordingly, a third pair can produce a range measurement in a third direction thereby establishing a three-dimensional coordinate system (x,y,z) if the first, second, and third range measurement projections are orthogonal to one another.

Notably, the sensing unit can contain multiple sensing elements positioned and arranged in various configurations for receiving range measurements in varying directions for calculating the position of the object causing the reflection using multi-path signal processing techniques. The paired transmit and receive elements can be on a same principal axis or a different principal axis. The sensing unit can also employ beamforming techniques for estimating the objects location. The system 100 can include a computer for receiving the coordinate signal from the sensing unit 110 or detector for moving a cursor object in accordance with a detected movement. The sensing unit 110 additionally produces differential coordinate signals for satisfying the input signal requirements of USB mouse input device or BlueTooth connection interface. Notably, a computer mouse generally uses a USB or PS/2 device driver for receiving differential signals for moving a cursor along each principal axis of the computer coordinate system. The sensing unit 110 can produce differential signal for each principal axis to comply with the requirements of the PS/2 and USB mouse device driver interface.

In one aspect, the sensing unit 110 determines a location of the finger using time of flight measurement for identifying navigational commands and sensory event commands. A navigational command is a movement along a horizontal and vertical plane in two dimensions. A sensory event command is an action along a third dimension orthogonal to the horizontal and vertical plane. For example, the touchless sensing unit 110 can produce a three-dimensional field. Movement along two dimensions (X, Y) corresponds to navigation, and movement along the third dimension (Z) corresponds to a finger action such as a button push or slide. A detector identifies whether the location of the finger is associated with a virtual component for activating a control. When the finger is active within the sensing field of the VUI 120 and navigating and controlling component within the UI 150, the processor 130 identifies sensory events the user initiates. The processor 130 keeps track of navigational commands and sensory events when the finger is within the sensing field. The processor 130 can extend the sensing field to a greater range by adjusting a sensitivity based on a position of the finger and a time length of the finger at a position. Adjusting the sensitivity changes the sensing field. In one example, the coordinator 116 increases the transmit pulse intensity to broaden the sensing field. Accordingly, the coordinator 116 decreases the transmit pulse intensity to lessen the sensing field. The coordinator 116 can also change the sensitivity in software to expand or shrinking the sensing field. For example, the detector 112 adjusts a sensitivity by linearly increasing the time of flight value corresponding to the locus of points along the boundary for extending the boundaries. Notably, the detector 112 decreases the boundaries by decreasing the time of flight values associated with the boundary.

Figure 2:
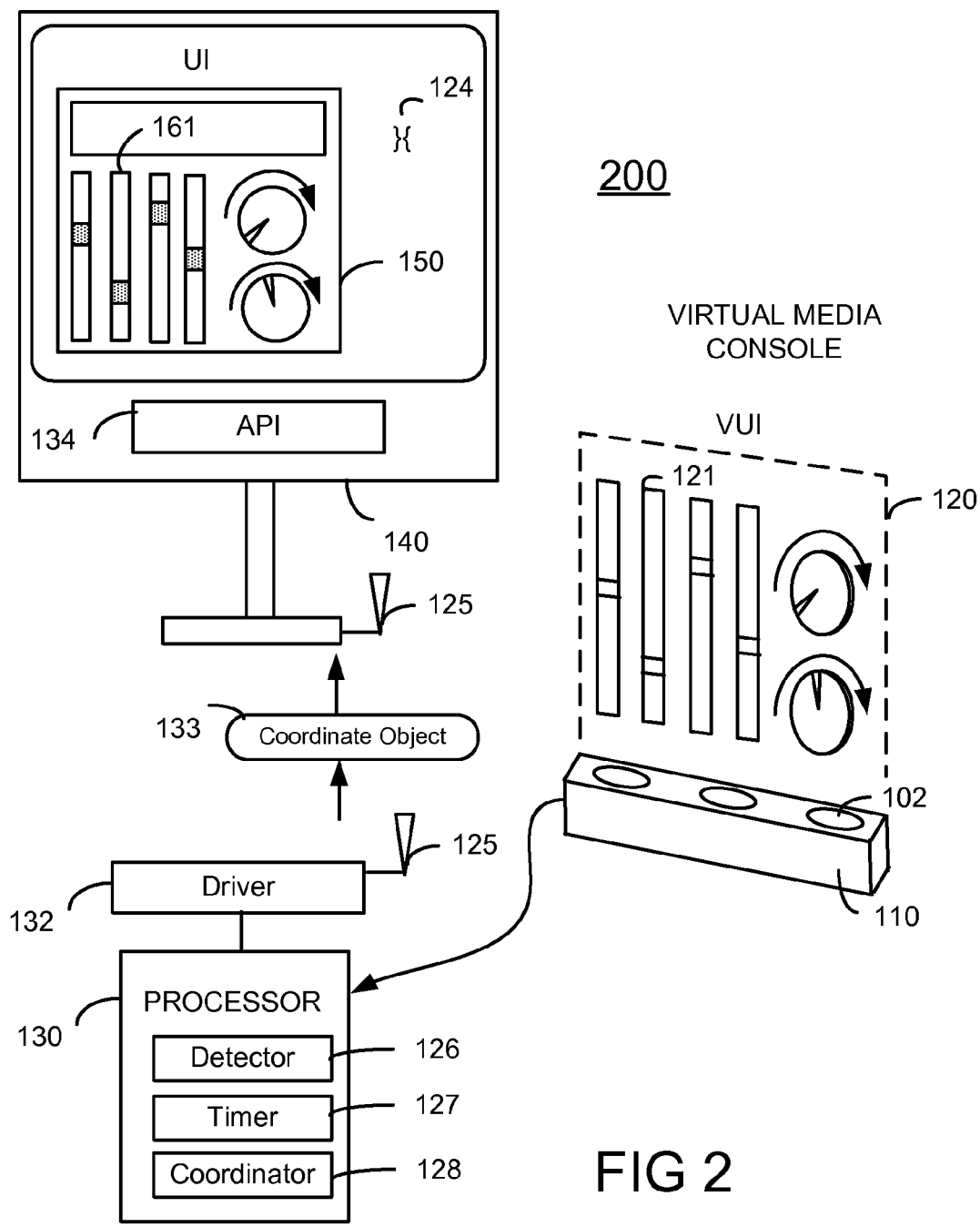
FIG. 2 illustrates an exemplary VUI application in accordance with an embodiment of the inventive arrangements.

Referring to FIG. 2, an exemplary VUI application is shown. In this example, the VUI application serves as a media console. A user can adjust one or more media settings, such as a volume level, via touchless finger actions on virtual components 121 in the VUI 120. Notably, the processor 130 can further includes a detector 126, a timer 127, and a coordinator 129. Briefly, the VUI 120 translates a coordinate space of the touchless sensory field to a coordinate space of the GUI 150. The touchless sensing unit can also include a wireless communication unit 125 for conveying signals to another processor hosting the UI 150, if the processor is external such as one in a computer or mobile device. In one aspect, the timer 127 can determine a time window for which an activation cue, such as the positioning of a finger in the VUI 120, is evaluated. For example, when a user intentionally places a finger directly on a virtual component for 1 second, the sensing unit 110 and timer 127 together identify the position and timing of the finger as a signal to commence a control, handled by the coordinator 129, such as the enabling of a navigational control to move a cursor 124 on the display 140. The detector 126 can determine when a movement is detected and identify the location of an object. The timer 127 determines a length of time an object, such as a finger, is at a particular location, and the coordinator 129 activates a virtual component control upon detection of an activation cue. An activation cue can be an intentional gesture or motioning of a finger to generate a sensory event within the sensory field. The communication unit 125 can be a wireless communication unit such as a Bluetooth of ZigBee compliant unit.

A user can adjust sliders 121 of the virtual media console within the VUI 120 for changing sliders 161 within the UI. The UI 50 may be a graphical user interface (GUI) to control audio channels for mixing audio sounds, or the sliders may be for equalization control, or any other media control. The VUI can also include rotation knobs similar to volume knobs for changing a volume or level of corresponding controls in the GUI. A user can move a finger in a clockwise or counterclockwise direction to generate sensory events and gain control of the virtual components. Again, as example, the UI controls may connect to an audio mixer which can adjust audio parameters, such as bass, treble, pan, balance, volume, and the like, in accordance with the touchless finger movements. FIG. 2, is an exemplary illustration for an VUI application, and various other applications are herein contemplated.

The coordinator 128 can pass the coordinate object 133 between the VUI 120 and the UI 150 for maintaining synchronization of actions detected in the VUI 120 and events activated in the UI 150. In one arrangement the UI 150 can implement a sensory API 134 which provides method and function call control to the UI 150 for handling the sensory events directly. The sensory API 134 can expose methods and variables for accessing the coordinate object 133 and for providing communication to and from the VUI 120 and the UI 150. The sensory API 134 provides portability across different platforms such as a computer, mobile device, or headset. The VUI application can be a C++ program, a Java program, a .NET program, an HTML program, and an XML program, and the coordinate object can be a web component such as an HTML object, an XML object, a Java Object, a C++ class structure, a .NET object, or a Java Servlet. In such regard, a VUI application can interface to a website to interact with one or more components in the website via touchless controls.

Another embodiment is a method for creating a coordinate object for use with a VUI application. The method can include identifying and tracking at least one object in a touchless sensory field, capturing a movement of the object within the touchless sensory field, and converting the movement to a coordinate object 133. The coordinate object 133 can be provided to the UI 150 for processing the sensory event. An absolute location, a relative difference, a velocity, and an acceleration of the object can be provided as parametric information to the UI 150 from the sensing unit 110. A sensory API 134 can expose the access to the underlying resources provided by the touchless sensing unit 110. The API 134, can encapsulate the underlying methods, functions, and variables for interfacing the UI 150 with the VUI 120. In one aspect, the parametric information can be translated from the sensory space of the finger to the coordinate space of a VUI application. In one arrangement, the VUI applications implements the sensory API 134 to interpret sensory behaviors to control the VUI application. The parametric information can be used to determine at least one of a push action, a release action, a hold action, and a sliding action of the object. An action, can be performed on a virtual component in the VUI application and passed in the coordinate object 133 to the UI 150. For example, a finger movement or finger action can be detected as a sensory event in the VUI 120 to navigate a menu within the UI 150, or for controlling graphical components within a GUI application. The coordinate object 133 can include a location and action of the finger detected in the sensing field of the VUI 120 by the touchess sensing unit 110.

Processing a finger action generally entails handling at least one touchless sensory event. The handling of the touchless sensory event can include receiving a coordinate object 133 containing at least one touchless navigation command, and processing the touchless navigation command to produce an action on a component within the UI 150. For example, the processing can include associating a touchless navigation command with a graphical component in a GUI. The VUI can perform similarly to a Graphical User Interface (GUI), though the activation behaviors are different. Whereas a GUI requires physical manipulation of an input device such as a mouse, keyboard, touchpad, or touchscreen, the VUI 120 involves touchless sensing such as moving a finger to particular locations and performing particular actions in the virtual interface. The navigation commands can also include instructions for arranging at least one graphical component in a visual layout of the VUI application. For example, a user can drag and drop components in the VUI 120 from within the sensing field which correlates to dragging and dropping the corresponding graphical components in the UI 150. Accordingly, graphical components can be arranged in accordance with the navigation commands detected. In practice, a position of the finger can be associated with at least one graphical component in the VUI application. An action on a graphical component in the UI 150 can be performed in response to at least one of a touchless finger depressing action, a touchless finger release action, a touchless finger hold action, or a touchless finger sliding action in the VUI 120. The action can generate a response from the GUI application 150, wherein the response can at least one of a visual change of the GUI application 150 or an audible response to the action. In one aspect, the VUI 120 can include a protocol adapter for converting one programming format to another programming format. Various management layer programs can communicate with the protocol adapter which in turn implements the API 134 to communicate with the native functions and methods of the sensing unit 110.

Figure 3:
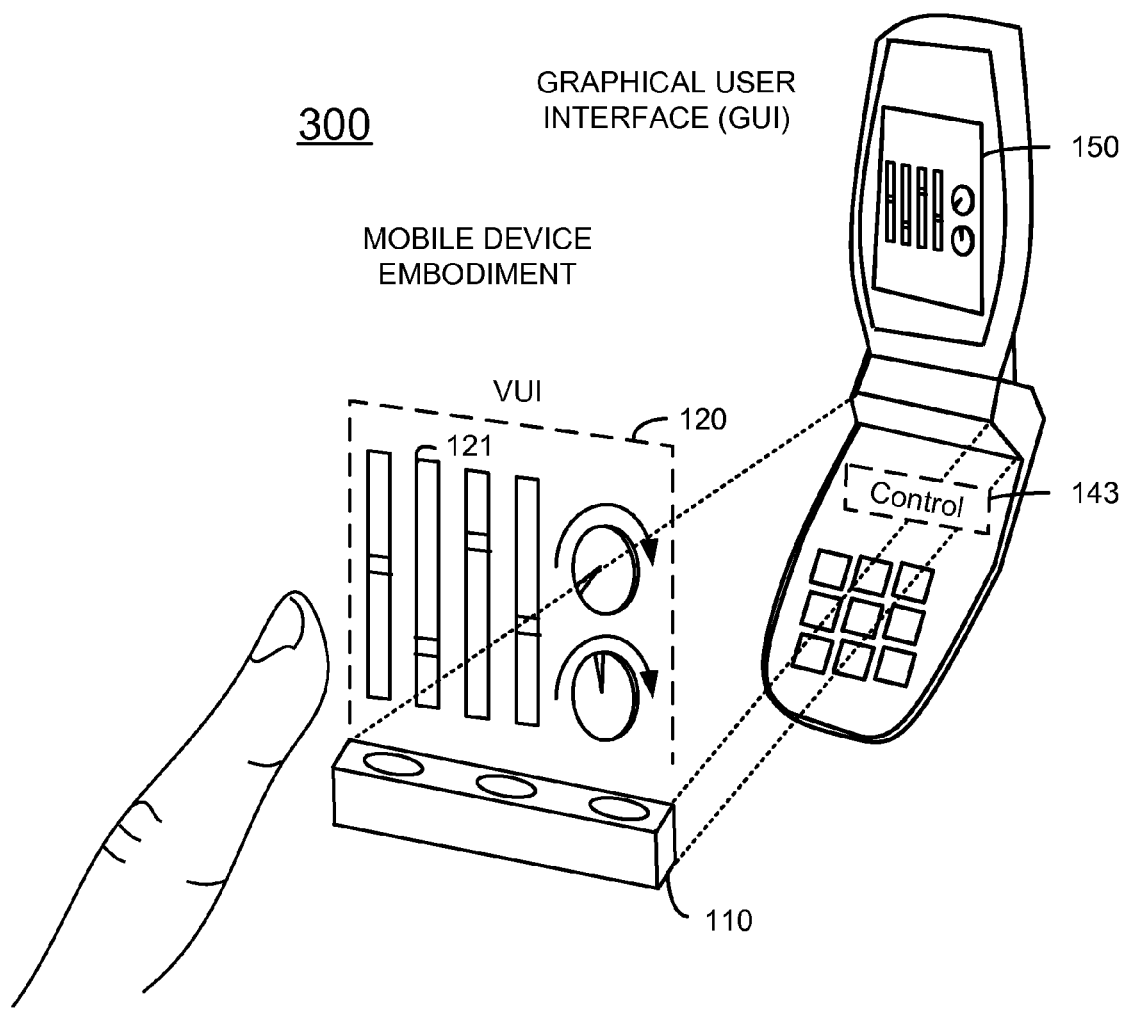
FIG. 3 depicts one embodiment of a VUI suitable for use with a mobile device in accordance with an embodiment of the inventive arrangements.

FIG. 3 depicts one embodiment of a VUI suitable for use with a communication device 300 in accordance with an embodiment of the inventive arrangements. The communication device may be a cell phone, a personal digital assistant, a radio, a portable music player, a security device, or any other suitable communication device. The communication device 300 presents a touchless virtual user interface (VUI) 120 which allows a user to control one or more operations of the communication device, or one or more handles to applications or services accessible through the communication device. The communication device can include a controlling element 143 that receives a coordinate object from the touchless sensing unit 110 operatively coupled or integrated with the communication device 300. The controlling element 143 can control at least a portion of a user interface (UI) 150 using the coordinate object. More specifically, the controlling element 143 controls at least one user component in the UI 150 in accordance with touchless finger movements applied to at least one virtual component in the touchless virtual user interface (VUI) 120.

The coordinate object can identify at least one among an absolute location, a relative difference, a velocity, a length of time, and an acceleration of a finger producing the touchless finger movements for controlling at least a portion of the GUI. In one aspect, the coordinate object can identify at least one among a positioning action, a push action, a release action, a hold action, and a sliding action for controlling at least a portion of the UI. In another aspect, the coordinate object can identify at least one among an up movement, down movement, left movement, right movement, clockwise movement, and counterclockwise movement of a finger producing the touchless finger movements for controlling at least a portion of the GUI.

During touchless interfacing, the controlling element 143 can generate at least one among a visual indicator or an audio indicator of a user component in the UI 150 in response to a touchless finger action applied to a virtual component in the VUI 120. For example, the communication device 300 can change a color, size, orientation, look and feel, of a user component in the UI 150 in response to a finger action applied to a virtual component in the VUI 120. The controlling element 143 can correlate a position the finger in the VUI with at least one graphical component in a graphical user interface (GUI). The UI 150 can also exposes at least one property option for adjusting a sensitivity of the VUI. For example, the communication device 150 may present options for adjusting a size of the virtual components in the VUI 150, or a sensitivity to touchless finger actions.

It should also be noted that the size of the VUI 120 and the GUI 150 may differ. In particular, the VUI 120 can be a magnified representation of the GUI 150. That is, the sensing field may encompass a larger virtual area than the corresponding size of the display on the communication device 300. This allows a user, through the VUI 120, to interact with more components on the UI 150 than may be available through a keypad, touchpad, or touchscreen of the communication device 300. Notably, with physical touch based interfaces, a user is generally limited to the physical buttons on the communication device, which cannot support more components due to the size of the components and a user's ability to handle the small components. The VUI 120 can effectively increase the size of the UI 150 to generate a larger VUI 120 thereby expanding the availability of interface components to the communication device 300.

Figure 4:
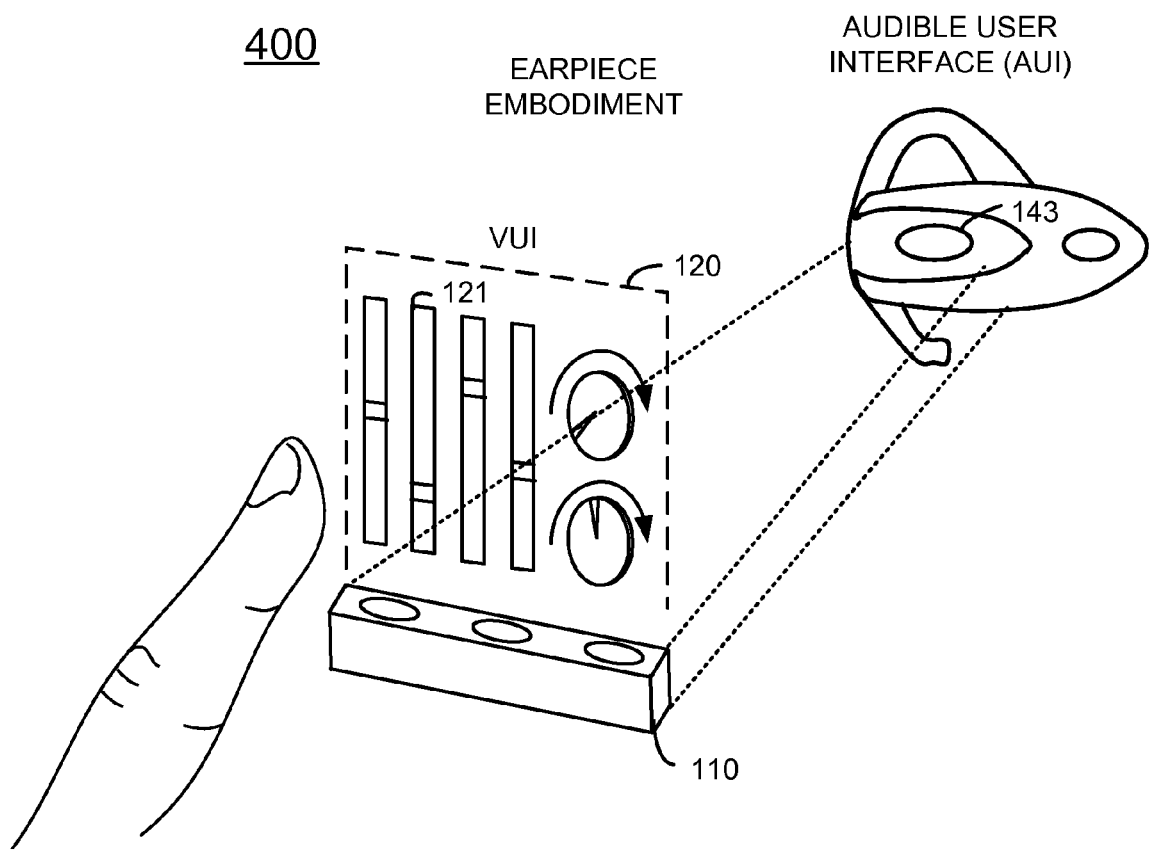
FIG. 4 depicts one embodiment of a VUI suitable for use with a head set in accordance with an embodiment of the inventive arrangements.

FIG. 4 depicts another exemplary embodiment of a VUI suitable for use with a head set 400 in accordance with an embodiment of the inventive arrangements. Briefly, the headset 400 provides an audible user interface (AUI) since a graphical user interface is not generally visible when the headset 400 is actively used. The AUI provides audible feedback as a user navigates through the VUI 120 of the headset. For example, as the user increases a volume control, the headset can indicate an increase or decrease in the volume. For instance, a sound clip may be played identifying the volume level, or a synthetic voice may speak the level of the volume. Notably, the sensing unit 110 is expanded for purposes of illustration only. In practice, a minitaturized sensing unit 110 can be mounted to the headset, or integrated within the headset. In one arrangement, the sensing field presenting the VUI 150 may be approximately horizontal in contrast the approximately vertical arrangement shown. In another embodiment, the controls may be layered, wherein an adjustment of a first control results in a new set of controls. A user can navigate through the one or more layers through up/down, left/right, and clockwise/counterclockwise finger movements.

Embodiments of the invention also concern a method for presenting a property option of a virtual pointer for use in a touchless user interface. The method can include identifying a touchless sensitivity within which an object acquires control a virtual pointer, and exposing at least one property option for adjusting a behavior of the virtual pointer in the touchless sensitivity field. The sensitivity field can be represented in three-dimensions. Property options can include selecting a virtual pointer speed for tracking the object, such as a finger, enhancing a virtual pointer precision for adjusting a resolution of tracking, automatically moving a virtual pointer to a virtual component when the object is within a predetermined distance of the virtual component, displaying virtual pointer trails as the object moves within the touchless sensory field, showing the location of a virtual pointer when a virtual component is activated, presenting a dialog box for displaying at least one virtual pointer property option.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is VUIted. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A virtual user interface (VUI) that maps touchless and non-visible virtual components in a three-dimensional ultrasonic touchless sensing field to touchable and visible user components in a Graphical user interface (GUI) of a differing size managed by a computing device, and translates touchless finger actions applied to the virtual non-visible components in the VUI to actions on the touchable user component in the GUI, where the VUI comprises:
   an ultrasonic sensing unit that generates the 3D ultrasonic touchless sensory field providing separate 2D <x,y> navigation control and 1D <z> user event control;
   a processor communicatively coupled to the sensing unit that identifies and tracks a finger movement within the ultrasonic touchless sensory field;
   a timer that determines a length of time finger is at a position nearest to a VUI component during 2D <x,y> navigation control and prior to 1D <z> user event control;

a coordinator to adjust a sensitivity of the ultrasonic touchless sensing field at a VUI component associated with the finger position and length of time;

a driver communicatively coupled to the processor for converting the finger movement to a coordinate object that includes the navigation control, user event control and length of time and providing the coordinate object to the computing device; and an applications program interface (API) running on the computing device and communicatively coupled to the driver that:

exposes programmable methods and variables to provide call control of the coordinate object to the UI for handling sensory events in the ultrasonic touchless sensory field; and provides a visual indicator that expands or shrinks a GUI component along its boundary mapped to the VUI component according to the adjusted sensitivity and mapping;

wherein the touchless sensing unit:

emits a plurality of ultrasonic pulses from a first ultrasonic transmitter configured to transmit the ultrasonic pulses;

estimates for a plurality of ultrasonic receivers a time of flight between transmitting one of the ultrasonic pulses and receiving a reflected ultrasonic signal corresponding to a reflection off the finger;

calculates for the plurality of ultrasonic receivers a phase differential between the reflected ultrasonic signal and a previously received reflected ultrasonic signal, and determines a location and relative displacement of the finger from a mathematical weighting of said time of flight by said phase differential for mapping the virtual components of the VUI to the user components of the UI.

2. The virtual user interface of claim 1, wherein the coordinate object identifies at least one of a positioning action, a push action, a release action, a hold action, and a sliding action of a finger producing the finger movement in the touchless sensory field.

3. The virtual user interface of claim 1, wherein the coordinate object includes one among an absolute location, a relative difference, a velocity, a length of time, and an acceleration of a finger producing the finger movement in the touchless sensory field.

4. The virtual user interface of claim 1, where the applications program interface (API) implemented by the computing device for controlling at least a portion of the UI in accordance with touchless finger movements in the VUI exposes open language programmable methods and variables for programming portability to provide call control to the UI for handling sensory events and accessing the coordinate object through the driver.

5. The virtual user interface of claim 1, wherein the driver is at least one among a tablet driver, a touchpad driver, a touchscreen driver, a stylus driver, and a mouse driver.

6. The virtual user interface of claim 1, wherein the UI generates one of a visual behavior that changes the GUI component size in response to the length of time and finger movement for both the acquiring and controlling of the non-visible and touchless virtual component in the VUI.

7. A method for supplying a coordinate object to a computing device and controlling at least a portion of a three-dimensional (3D) ultrasonic user interface (UI) managed by the computing device, the method comprising the steps of:

detecting a generally stationary finger and a length of time the finger is at a location nearest to a Virtual User Interface (VUI) component in the 3D ultrasonic UI;

adjusting a sensitivity of the VUI component in the 3D ultrasonic UI according to the length of time at the finger position to magnify a corresponding Graphical User Interface (GUI) component on the computing device;

detecting thereafter a forward and retracting touchless finger action applied to-the VUI component at the location in the 3D ultrasonic UI generated by an ultrasonic sensing unit providing separate 2D <x,y> navigation control and 1D <z> user event control;

converting the finger action to a coordinate object that includes the navigation control, user event control and length of time and communicating the coordinate object to the computing device by way of a driver implemented on the computing device that communicates with the ultrasonic sensing unit;

providing a visual indicator that expands or shrinks the GUI component along its boundary according to the coordinate object and mapping of the adjusted VUI component size; and controlling at least a portion of the GUI using the coordinate object by way of an Applications Programming Interface (API) on the computing device that communicates with the driver through native functions and methods of the ultrasonic sensing unit to implement sensitivity adjustment;

wherein the converting further includes translating a coordinate space of the touchless sensory field to a coordinate space of the UI, and wherein the coordinate object identifies at least one among an absolute location, a relative difference, a velocity, and an acceleration of the finger in the touchless sensory field where the touchless sensing unit:

emits a sequence of ultrasonic pulses from a first ultrasonic transmitter configured to transmit the ultrasonic pulses;

estimates for a plurality of ultrasonic receivers a time of flight between transmitting one of the ultrasonic pulses and receiving a reflected ultrasonic signal corresponding to a reflection off the finger;

calculates for the plurality of ultrasonic receivers a phase differential between a first reflected ultrasonic signal at a first time and a second reflected ultrasonic signal at a second time, and determines a location and relative displacement of the finger from a mathematical weighting of said time of flight by said phase differential for mapping the virtual components of the VUI to the user components of the UI.

8. The method of claim 7, wherein the touchless sensing unit exposes open language programmable methods and variables for programming portability to provide call control to the UI for handling sensory events and accessing the coordinate object through the driver, where the coordinate object identifies at least one among an up movement, down movement, left movement, right movement, clockwise movement, and counterclockwise movement of the finger action for controlling at least a portion of the UI.

9. The method of claim 7, wherein the coordinate object identifies at least one of a touchless push action, a touchless release action, a touchless hold action, and a touchless slide action of the finger on at least one virtual component.

10. The method of claim 7, wherein the UI generates at least one of a visual indicator or an audible indicator in response to a finger action applied to a virtual component in the touchless sensory field that corresponds to a user component in the UI.

11. The method of claim 9, wherein the coordinate object is transmitted in response to the touchless sensing unit detecting a touchless sensory event on the one virtual component and is a web component that is at least one among an HTML object, an XML object, a Java Object, a C++ class object, a .NET object, and a Java Servlet.

12. A communication device for presenting a touchless virtual user interface (VUI), the communication device having a controlling element that
- receives a coordinate object from a touchless ultrasonic sensing unit and controls at least a portion of a user interface (UI) using the coordinate object, and
- exposes an open language programmable Applications Programming Interface with methods and variables for coding portability to provide call control to the UI for handling touchless sensory events in the VUI and accessing the coordinate object through a driver that communicates with native functions and methods of the touchless ultrasonic sensing unit.
- wherein the controlling element controls at least one user component in the UI in accordance with touchless finger movements applied to at least one virtual component in the touchless virtual user interface (VUI);
- wherein the controller element is a Digital Signal Processor (DSP) that:
- emits a plurality of ultrasonic pulses from a first ultrasonic transmitter;
- estimates a time of flight between when said ultrasonic pulse was transmitted from said first ultrasonic transducer and when a reflection of said ultrasonic pulse off the finger in said three-dimensional space was received from a plurality of ultrasonic receivers;
- estimates a phase differential between a first reflected ultrasonic signal and a second ultrasonic reflected signal both received from a same ultrasonic receiver for the plurality of ultrasonic receivers, and
- determines a location and relative displacement of the finger from a mathematical weighting of said time of flight by said phase differential, and
- generates the coordinate object for mapping the virtual components of the VUI to the user components of the UI, and that identifies at least one among an absolute location, a relative difference, a velocity, a length of time, and an acceleration of a finger producing the touchless finger movements for controlling at least a portion of the UI.

13. The communication device of claim 12, wherein the coordinate object identifies at least one among a positioning action, a push action, a release action, a hold action, and a sliding action for controlling at least a portion of the UI.

14. The communication device of claim 12, wherein the coordinate object identifies at least one among an up movement, down movement, left movement, right movement, clockwise movement, and counterclockwise movement of a finger producing the touchless finger movements for controlling at least a portion of the UI.

15. The communication device of claim 12, wherein the UI exposes at least one property option for adjusting a sensitivity of the VUI that changes Time of Flight values corresponding to a locus of points along a boundary of the VUI component for extending the boundaries of the GUI component.

16. The communication device of claim 12, wherein the controlling element generates at least one among a visual indicator or an audio indicator of a user component in the UI in response to a touchless finger action applied to a virtual component in the VUI.

17. The communication device of claim 12, wherein the controlling element correlates a position the finger in the VUI with at least one graphical component in a graphical user interface (GUI).

* * * * *